No. 882,781. PATENTED MAR. 24, 1908.
W. H. GERFIN.
PRUNING IMPLEMENT.
APPLICATION FILED NOV. 15, 1907.
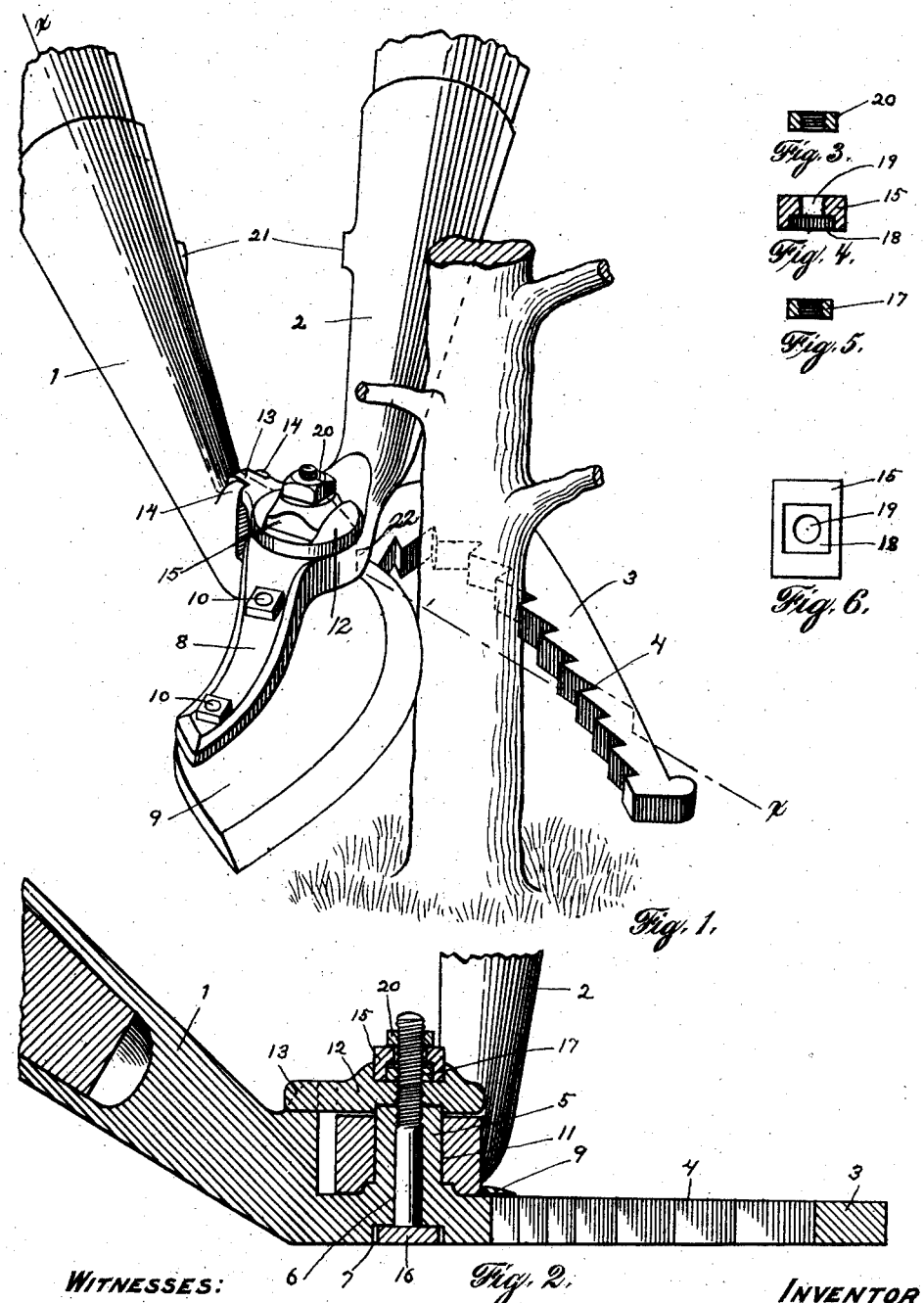

UNITED STATES PATENT OFFICE.

WILLIAM H. GERFIN, OF EAST PETERSBURG, PENNSYLVANIA.

PRUNING IMPLEMENT.

No. 882,781.  Specification of Letters Patent.  Patented March 24, 1908.

Application filed November 15, 1907.  Serial No. 402,286.

*To all whom it may concern:*

Be it known that I, WILLIAM H. GERFIN, a citizen of the United States, residing at East Petersburg, in the county of Lancaster and State of Pennsylvania, have invented certain new and useful Improvements in Pruning Implements, of which the following is a specification, reference being had therein to the accompanying drawing.

My invention relates to improvements in pruning implements and more directly to that class used for cutting tobacco, and the objects of my invention are to produce a cheap, simple and strong pruning shears, which is adapted to grasp and cut a large stalk, owing to the wide spreading of the jaws when open and the toothed edge of the grasping jaw, which holds the stalk from slipping away from that part of the blade where the greatest cutting power is produced by the least labor; also the pivot-bolt having a square head and being countersunk in the lower blade member keeps said bolt from turning or being loosened by the movement of the jaws, which object is further secured by a washer and nut-lock of special design, which will hereinafter be fully described. The pivot-boss on the lower jaw, and the pivot-socket on the upper jaw provide an oil retainer and a perfectly rigid pivot for said jaws.

In the drawings:—Figure 1, is a perspective view of the implement in the act of cutting a stalk. Fig. 2, is a horizontal sectional view on the line $xx$ of Fig. 1, showing a the pivot construction. Fig. 3, is a sectional view of the nut-lock. Fig. 4, is a sectional view of the nut-cap. Fig. 5, is a sectional view of the inner nut. Fig. 6, is a bottom view of the nut-cap.

Like figures indicate corresponding parts in all the views of the drawings.

1, and 2, designate the two main members of the implement which are pivotally connected together as will be hereinafter described.

The lower member 1, is formed with the hooked extension 3, which is provided with ratchet-shaped teeth 4, on its inner curved edge; and the pivot-boss or projection 5, which is pierced vertically through its center by the pivot-bolt hole 6, said bolt-hole 6 terminating in a square orifice 7, in the bottom surface of said member 1.

The member 2, is formed with a projection 8, to the lower surface of which is rigidly secured the blade 9, by the bolts or rivets 10, the cutting edge of said blade 9, being curved in form and beveled downward to form a cutting edge and designed to pass over and form a cutting contact with the upper surface of the toothed extension of the member 1, when the jaws of the shears are closed together.

Between the projection 8, of the member 2, and its handle-socket is formed a circular enlargement 22, pierced by the orifice 11, and adapted to embrace the pivot-boss 5, on the member 1; the top of said boss extending slightly above the upper surface of the enlargement on the member 2, and thus pivoting the members one upon the other. Upon the upper surface of the enlargement 2, is placed the washer 12, which is formed with the lug 13, extending therefrom and engaged by two stop-lugs 14, formed upon the upper side of the intersection of the handle-socket with the base of the member 1, for the purpose of retaining said washer 12, from turning. The upper surface of said washer is rounded and slotted transversely for the reception of the nut-cap 15, said washer 12, and nut-cap 15, being pierced by the pivot-bolt 16, which extends upward through the boss 5. The under surface of the washer 12, is countersunk to fit over the projecting end of the boss 5, thus allowing the member 2, a freer movement than if said washer 12 were secured in close contact with the upper surface of said member 2.

The square head of the pivot-bolt 16, being retained within the orifice 7, prevents said pivot-bolt 16, from turning, while said pivot-bolt 16, is secured in place by the nut 17, which is threaded upon, and screwed down upon said bolt and into contact with the surface of the slot upon the upper surface of the washer 12, the width of said slot allowing the points of the nut 17 to freely pass within its sides: said nut is retained from loosening or backing off said pivot-bolt 16, by the nut-cap 15, which is formed with a square orifice 18, in its lower surface concentric with the bolt-hole 19, which extends through it; said nut-cap 15, being adapted to inclose the nut 17, while the outer edges of said nut-cap 15, are rigidly held in place by the inner edges of the slot in the upper surface of the washer 12, thus securely preventing said nut 17 and cap 15, from turning, while said cap 15 is further secured in place by the lock-nut 20, which is threaded upon the bolt 16, and screwed down upon the upper surface of the cap 15, thus completing the pivot-joint of the implement members. The handle-socket extensions of said members are provided with bosses 21, which when the implement is closed, abut against each other, and thus prevent the shear-members from being closed too far.

The operation of the device will be so well understood from the foregoing description, that it will need no further explaining, except that the height of the boss 5, and the slight extension of the same above the other member of the implement will afford a large oiling and bearing surface, while the combination of the washer and nut-cap with the pivot-bolt and nuts, forms a very secure joint without producing friction of the working parts, and no danger of the joint becoming loosened. The toothed jaw is a feature of great importance for retaining the stalk at the point of greatest cutting power of the jaws, with the least labor by the operator.

Having thus described my invention what I claim as new and desire to secure by Letters Patent is:—

1. As an article of manufacture, a pruning implement, consisting of two pivoted jaws; one jaw provided with a grasping edge and the other jaw with a cutting edge: a pivot-boss extending upward from the grasping jaw member: a pivot-socket formed in the cutting jaw member and embracing the pivot-boss upon said grasping member: a washer slotted upon its upper surface and formed with a recess upon its lower surface, and provided with an extending lug: stop-lugs formed upon the handle-socket of the grasping member and engaging the lug of said washer, and means for retaining said washer in place, as set forth.

2. As an article of manufacture, a pruning implement, consisting of two pivoted jaws, a pivot-socket formed in one jaw, embracing and pivoted upon a boss formed upon the other jaw: a washer formed with a recess in its lower surface, said recess bearing upon the projecting top of said pivot-boss, and means for securing said washer in place.

3. As an article of manufacture, a pruning implement, consisting of two jaws, a cutting jaw and a grasping jaw, one pivoted upon the other, a pivot-boss upon one jaw working within a pivot-socket contained within the other jaw: a washer formed with a recess in its lower surface, embracing the top of said pivot-boss, and an extending lug engaged by stop-lugs formed upon the handle of said grasping jaw: a pivot bolt and a nut engaging the same, a nut-cap formed with a recess in its under surface and an orifice vertically through its center, adapted to slip over the end of the pivot-bolt and nut and be securely held within the sides of the recess in said washer, and a lock nut on the bolt for securing the nut-cap for the purpose set forth.

In testimony whereof I affix my signature in presence of two witnesses.

WILLIAM H. GERFIN.

Witnesses:
   MABEL L. LEFEVRE,
   G. W. MESSNER.